United States Patent
Dockter et al.

[11] Patent Number: 5,870,737
[45] Date of Patent: Feb. 9, 1999

[54] DYNAMIC PRIORITIZED REPLACEMENT OF LANGUAGE

[75] Inventors: Michael Jon Dockter, Hollister; Joel Frank Farber, San Jose; Michael Leon Pauser, Morgan Hill; Randal James Richardt, San Jose; R. Brant Ruggles, Morgan Hill, all of Calif.

[73] Assignee: International Business Machines Corporation, Armonk, N.Y.

[21] Appl. No.: 632,817

[22] Filed: Apr. 15, 1996

[51] Int. Cl.⁶ .................................................. G06F 17/30
[52] U.S. Cl. ........................................ 707/4; 707/5
[58] Field of Search ................... 395/604, 605; 707/4, 5

[56] References Cited

U.S. PATENT DOCUMENTS

| | | | |
|---|---|---|---|
| 4,905,163 | 2/1990 | Garber et al. | 395/63 |
| 5,206,949 | 4/1993 | Cochran et al. | 395/600 |
| 5,267,155 | 11/1993 | Buchanan et al. | 364/419.14 |
| 5,584,024 | 12/1996 | Shwartz | 395/604 |
| 5,659,724 | 8/1997 | Borgida et al. | 395/603 |

*Primary Examiner*—Maria N. Von Buhr
*Attorney, Agent, or Firm*—Ohlandt, Greeley, Ruggiero & Perle

[57] ABSTRACT

A computer system responds to a user query by providing a screen which displays a response that is influenced by prior expressed preferences of the user. The computer system includes a knowledge base of data pertaining to one or more subjects. The system monitors a user's entries and records priority information regarding data preferences of the user. Upon receiving a user's query regarding a selected subject in the knowledge base, the system selects a template for responding to the user's query. The template contains both fixed and variable fields and the system inserts replacement data in the variable fields. The replacement data is selected in accord with recorded priority information relating to the selected subject. The priority information enables a sorting of the replacement data so as to provide data to the user which is inferentially related to the user's prior entry history.

6 Claims, 9 Drawing Sheets

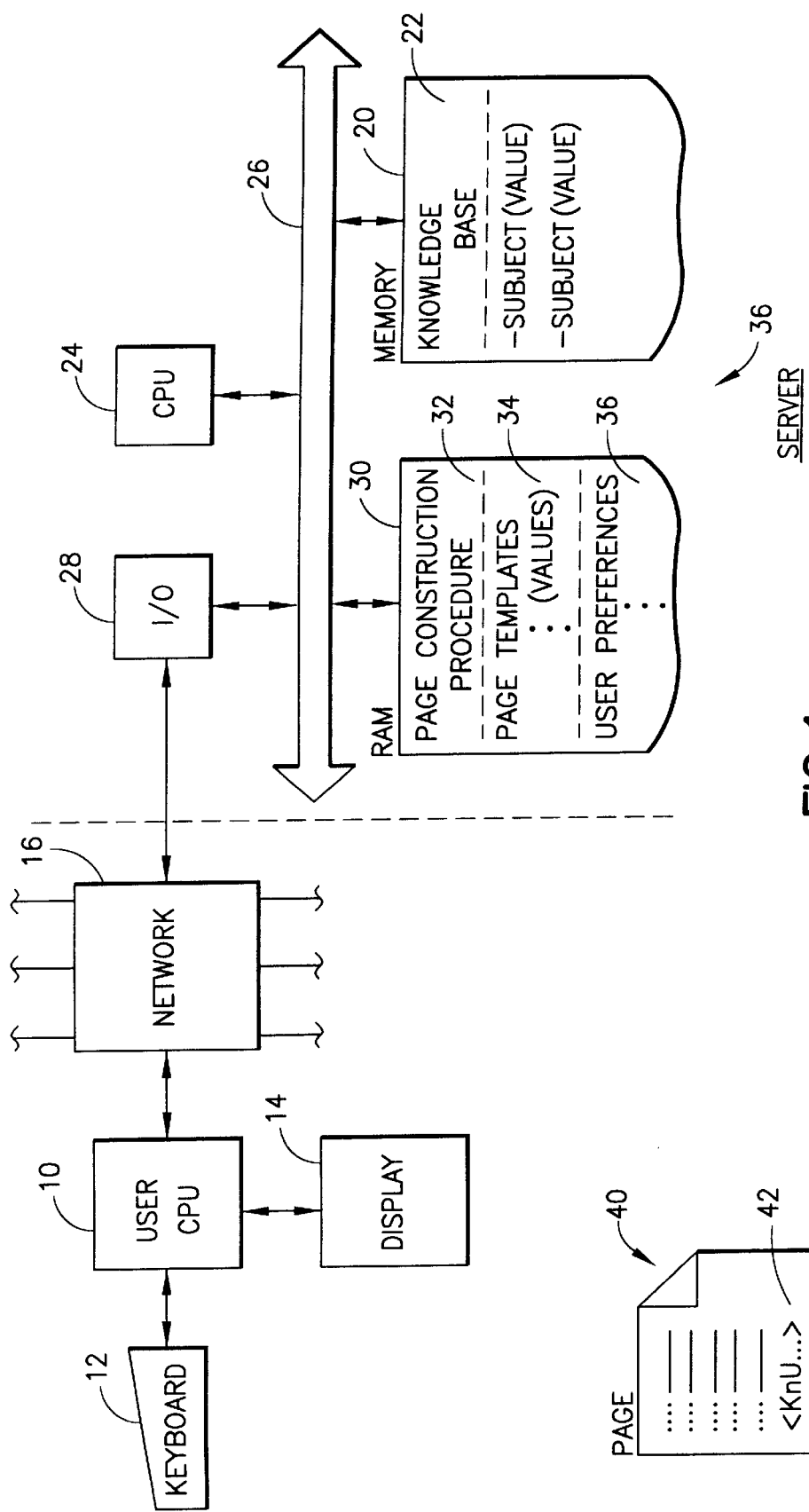

THE BOOKSTORE

Welcome to *The BookStore*, the best book bargains west of the North Pole! Come browse our BookShelves...

| Business BookShelves  |
|---|

| Children's BookShelves  |
|---|

| Computer's BookShelves  |
|---|

Or...
- Suggested readings
- Suggested software

We, at *The BookStore*, take pride in bringing you the best in books. If you have any suggestions in how we can serve you better, please email us at *BookMaster@BookStore.ibm.com*

FIG.3a

The Children's Bookshelf

Here is a list of children's books. Let us know which what you like and don't like by giving a "thumbs-up" or "thumbs-down". When you "Restock the shelves" we'll put new books on the shelves which are like your favorites.

 I love the Orchestra is an introduction to the orchestra for children ages 6–12.

 The Way Things Work describes in colorful detail how everyday thing work.

 Call of the Wild–Rudyard Kipling is a children's classic!

 Baseball for Billy is a delightful tail of Billy's first year in Little League.

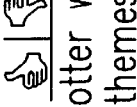 OZ's World is an adventure which features Ozzi S. Otter, a young, curious sea otter whose extraordinary friends tell stories and introduce activities with environmental themes.

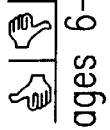 The Emergency Room explains what happens in an emergency room children ages 6–12.

We, at *The BookStore*, take pride in bringing you the best in books. If you have any suggestions in how we can serve you better, please email us at *BookMaster@BookStore.ibm.com*

Return to store front

FIG.3b

The Children's Bookshelf

Here is a list of children's books. Let us know which what you like and don't like by giving a "thumbs-up" or "thumbs-down". When you "Restock the shelves" we'll put new books on the shelves which are like your favorites.

👍 👎 Baseball for Billy is a delightful tail of Billy's first year in Little League.

👍 👎 I love the Orchestra is an introduction to the orchestra for children ages 6-12.

👍 👎 Call of the Wild-Rudyard Kipling is a children's classic!

👍 👎 The Emergency Room explains what happens in an emergency room children ages 6-12.

👍 👎 OZ's World is an adventure which features Ozzi S. Otter, a young, curious sea otter whose extraordinary friends tell stories and introduce activities with environmental themes.

👍 👎 The Way Things Work describes in colorful detail how everyday thing work.

We, at *The BookStore*, take pride in bringing you the best in books. If you have any suggestions in how we can serve you better, please email us at *BookMaster@BookStore.ibm.com*.

Return to store front

FIG.3c

The Children's Bookshelf

Here is a list of children's books. Let us know which what you like and don't like by giving a "thumbs-up" or "thumbs-down". When you "Restock the shelves" we'll put new books on the shelves which are like your favorites.

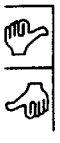 I love the Orchestra is an introduction to the orchestra for children ages 6-12.

 Baseball for Billy is a delightful tail of Billy's first year in Little League.

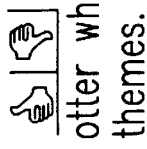 OZ's World is an adventure which features Ozzi S. Otter, a young, curious sea otter whose extraordinary friends tell stories and introduce activities with environmental themes.

 Call of the Wild-Rudyard Kipling is a children's classic!

 The Emergency Room explains what happens in an emergency room children ages 6-12.

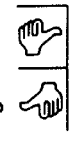 The Way Things Work describes in colorful detail how everyday thing work.

We, at *The BookStore*, take pride in bringing you the best in books. If you have any suggestions in how we can serve you better, please email us at *BookMaster@BookStore.ibm.com*

Return  store front

FIG.3d

The Computer Software Bookshelf

Here is a list of computer software. Let us know which what you like and don't like by giving a "thumbs-up" or "thumbs-down". When you "Restock the shelves" we'll put new software on the shelves which are like your favorites.

 ProLeague Baseball gives you a chance to run a professional baseball team.

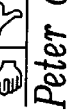 Peter and the Wolf lets your children's imaginations take over as they experience *Peter and the Wolf*.

 Kid Riffs opens the world of music for children in fascinating ways.

 The Adventures of Hyperman tells the story of Emma C. Squared, a kid genius who has made the first known mistake of her intellectual career.

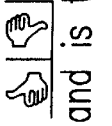 Mad Dog McCree I is known worldwide as one of the highest rated arcade games and is the first interactive shooting game with real live motion picture action.

 The book of ShadowboxesI is a story of the ABC's.

 Emergency Room lets you be in the Emergency Room Doctor.

We, at *The BookStore*, take pride in bringing you the best in books. If you have any suggestions in how we can serve you better, please email us at *BookMaster@BookStore.ibm.com*

Return to  store front

FIG.3f

THE BOOKSTORE

Welcome to *The BookStore*, the best book bargains west of the North Pole! Come browse our BookShelves...

| Business BookShelves   |

| Children's BookShelves   |

| Computer's BookShelves   |

Or...
- Suggested readings
- Suggested software

We, at *The BookStore*, take pride in bringing you the best in books. If you have any suggestions in how we can serve you better, please email us at *BookMaster@BookStore.ibm.com*

FIG.3g

AISLE #1: SPECIALS
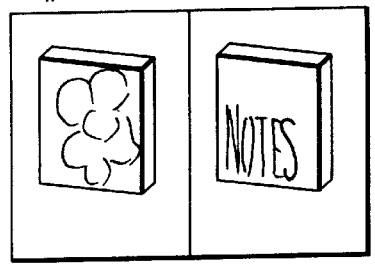
AISLE #2: GAMES AND ENTERTAINMENT
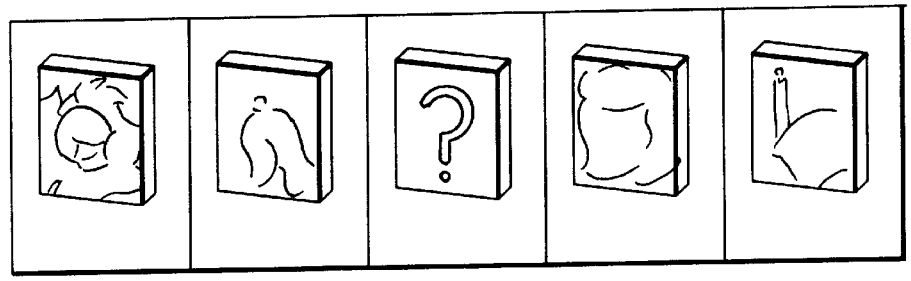
AISLE #3: MULTIMEDIA
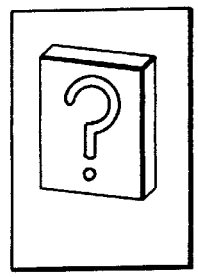
AISLE #4: TRANSACTION PROCESSING
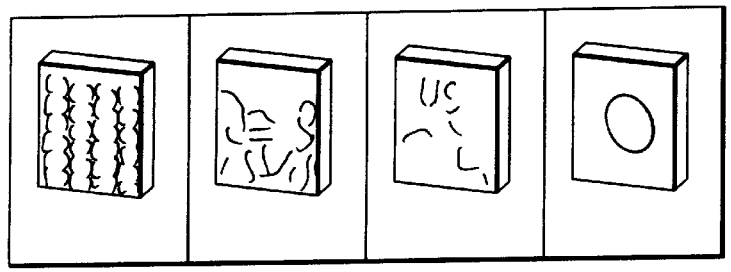
FIG.3h

DYNAMIC PRIORITIZED REPLACEMENT OF LANGUAGE

RELATED PATENT APPLICATIONS

This application is related to the following co-pending patent applications which are hereby incorporated by reference:

Facility for the Intelligent Selection of Information Objects (Persona)—Ser. No. 08/262,834 filed Jun. 21, 1994, pending;

Method for Generating Connections Between Objects in a Computer Network (Grinding) - - - Ser. No. 08/262,999 filed Jun. 21, 1994, now U.S. Pat. No. 5,608,900, issued Mar. 4, 1997;

Method for the Association of Heterogenous Information - - - Ser. No. 08/262,838 filed Jun. 21, 1994, now U.S. Pat. No. 5,745,895, issued Apr. 28, 1998; and Facility for the Storage and Management of Connections (Connection Server) - - - Ser. No. 08/267,022 filed Jun. 21, 1994, now U.S. Pat. No. 5,687,367, issued Nov. 11, 1997.

FIELD OF THE INVENTION

This invention relates to a computer-based method and apparatus for responding to a user query to a database by providing a display screen with a response and, more particularly, to a method for adjusting the content of the response so that they reflect and are influenced by prior expressed preferences of the user.

BACKGROUND OF THE INVENTION

Databases, both local and distributed, contain enormous volumes of information. No longer is the information limited to textual entries, but rather it includes a variety of data that is available in the form of video, audio, photographs, etc. In order to locate a particular subset of data quickly, the user, in general, traces and retraces various search routines through the database "world" until a certain level of familiarity is achieved. At such point, the possibility exists of being able to locate the desired subset of data in a reasonable period of time.

The prior art has attempted to provide various techniques for filtering the breadth of information or for narrowing the scope of search for a particular information subset. Common word searching is one technique which is employed, but requires a high level of skill on the part of the user to be effectively utilized. A common feature of all search techniques is that they rely upon the accumulated knowledge of the user for successful accomplishment of a search task. The systems which incorporate the data do not, themselves, accumulate a history of the user's actions, but rather require the user to acquire the skill to enable a reasonable utilization of the search tools.

In the above-noted Application entitled "Facility for the Intelligent Selection of Information Objects" (Persona), incorporated herein by reference, an automated facility is provided for determining the value of information, based on each user's subjective preferences. A search is executed by comparing the user's preferences with prior characterizations of information objects or sets, which are the subject of the search. Once the comparisons are made, an ordered list is compiled of a set of data sources, starting with a most relevant and ending with the least relevant. By selecting and reviewing only the most relevant references, the probability of locating a pertinent reference is increased, dramatically, while increasing the effectiveness of time spent reviewing the results.

The system set out in the referenced patent application initially provides a set of information objects or a knowledge base; specifies connections between the information objects and associates attribute values with those connections. The system further includes a navigation history, representing the user's previous history of "travel" through the various information objects. The user inserts a profile description which represents a current information preference. The system determines a subset of the information objects, in response to the user's input; any connections that are related to those information objects; and the attributes which are associated with the connections, which are further modified in accordance with user's navigation history information. The system dynamically computes utility values for the connections in the determined subset as a function of the connection attributes and the user profile description. Thereafter, the information objects are ordered in accordance with the computed utility values and are presented to the user in an ordered manner.

When a user interrogates a database, the usual interface is a display screen which provides replies from the database, in response to the user's inquiries. This is the case when the user queries a knowledge base or database site via the world-wide web (WWW). In that instance, the search action commences by the user accessing a home page, followed by sequential accesses to linked subsystems from the home page. Each subsystem responds to a user query by presenting a response screen.

Accordingly, it is an object of this invention to provide an improved system and method for responding to user queries to a knowledge base.

It is another object of this invention to provide a system and method for assuring that inquiries to a knowledge base are responded to with display screens which include data that is adaptively selected in accordance with prior expressed preferences of the user.

SUMMARY OF THE INVENTION

A computer system responds to a user query by providing a screen which displays a response that is influenced by prior expressed preferences of the user. The computer system includes a knowledge base of data pertaining to one or more subjects. The system monitors a user's entries and records priority information regarding data preferences of the user. Upon receiving a user's query regarding a selected subject in the knowledge base, the system selects a template for responding to the user's query. The template contains both fixed and variable fields and the system inserts replacement data in the variable fields. The replacement data is selected in accord with recorded priority information relating to the selected subject. The priority information enables a sorting of the replacement data so as to provide data to the user which is inferentially related to the user's prior entry history.

BRIEF DESCRIPTION OF THE DRAWINGS

FIG. 1 is a block diagram of a representative system for carrying out the invention hereof.

FIG. 2 is a schematic of a reply page template which includes a variable field for insertion of response data.

FIGS. 3a–3h illustrate a series of display screens which are altered in accord with prior user-expressed preferences.

DETAILED DESCRIPTION OF THE PREFERRED EMBODIMENT

Figure 3E:
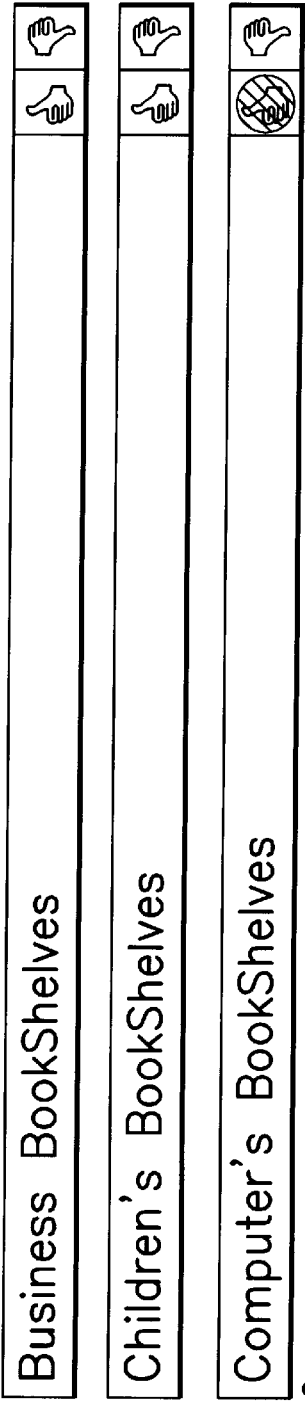

The invention hereafter will be described in the context of user inquiries propagated over the worldwide web to various server subsites, which respond in accordance with the user's inquiry. However, it is to be understood that the invention is equally applicable to any knowledgebase/database, query/response system, whether centrally or remotely located. Further, while the invention will be described in the context of a server which constructs web pages in accordance with a mark-up language currently used with Internet applications, other authoring languages and interactive environments are equally applicable venues for use with this invention.

Referring to FIG. 1, a user processor 10 includes a keyboard 12 and a display 14. User processor 10 communicates via network 16 (e.g., the Internet system) to a server 18. Server 18 includes a memory 20 which stores a knowledge base 22 comprising plural subjects, each subject including one or more associated connection value. The operation of server 18 is controlled by a central processing unit 24, which communicates with other modules in server 18 via a bus system 26. Input/output functions are handled via I/O module 28 and a random access memory (RAM) 30 includes both operating memory for server 18 and various subroutine procedures and data structures, to be hereafter considered.

A page construction procedure 32 enables CPU 24 to respond to user inquiries by constructing a page, with the variable fields therein filled in, in accordance with both a user's query and stored user preferences derived from previous user interactions. A plurality of page templates 34 are stored in RAM 30 and are associated with various subjects by common connection values. Each page template may be associated with plural subjects and thus include plural connection values. A further portion of RAM 30, i.e., user preferences 36, provides a history of prior user interactions with knowledge base 22 and indicates prior expressed user preferences with respect to the subjects contained therein.

Upon receiving a request for a web page, server 18 executes page construction procedure 32 which, in turn, causes a page template, such as shown in FIG. 2, to be accessed. Page template 40 (shown schematically) includes constant text which does not change from page to page and one or more variable fields 42, each of which is designated by <KnU . . .>, wherein a connection value (or values) follows the designator KnU and indicates that one or more subjects having a concurrent connection value is to be placed therein.

The specific subject that is inserted in variable field 42 is, however, influenced by the data stored in user preferences region 36 of RAM 30. The user preferences are employed to filter and prioritize subjects and, further, to control which entry is placed in variable field 42, even though plural subjects (and entries) may include a connection value that is the same as the value that is present in variable field 42.

In general, the user at processor 10 sends a request to server 18 which contains two segments of data, i.e., encodings which state a user preference and a request for a data which will respond to the indicated user query. Server 18 receives the preference encodings and aggregates them in user preferences area 36, with previous preference encodings for this particular user . Server 18 then returns the requested web page to the user, with responses selected under control of the aggregated user preferences. The user then sees the requested web page and may repeat the query/response procedure, as many times as desired.

Server 18, when it receives a request for the web page, as indicated above, utilizes page construction procedure 32 to determine, via a mapping function, which page needs to be created. Page construction procedure 32 selects a page template in accordance with the requested query and commences reading through the template and constructing the web page. When a variable field 42 is encountered, page construction procedure 32 determines, utilizing preference information for the particular user contained within user-preferences region 36, the best replacement text to include in the variable field. The selected data is then inserted into variable field 42, and the resulting web page is returned for display to the user.

Referring to FIGS. 3a–3h, an example will be given which illustrates the operation of the invention. It is assumed that knowledge base 22 in server 18 includes data regarding books on business subjects, childrens' subjects and computer-related subjects. The initial web page is illustrated in FIG. 3a and includes subject lines for business bookshelves, children's bookshelves and computer's bookshelves. At the end of each line, there are two icons, one showing a thumbs-up orientation and one a thumbs-down orientation. In order to select one of the three categories, the user places a cursor (in this case a shaded circle) over the thumbs-up icon next to a subject line and clicks on the thumbs-up icon.

In accordance with the selection shown in FIG. 3a, page construction procedure 32 accesses a page template entitled "the children's bookshelf" (see FIG. 3b) and includes an initial list of children's books. The selection of the list is a default selection, as the user is assumed to have expressed no prior preferences in regards to the subject of children's books.

Assume now that the user places the cursor over the thumbs-up icon next to the listing of the book "Baseball for Billy" and clicks thereon. That action is interpreted by page construction procedure 32 which enters an indication, for the user, of an interest in children's books and, more particularly, in the subject of baseball or sports. Further, page construction procedure 32 rearranges the listings and places the listing of "Baseball for Billy" at the top (see FIG. 3c).

Next assume next that the user places the cursor over the thumbs-up icon to the title "I Love the Orchestra" and clicks thereon. Again, page construction procedure 32 rearranges the listing (see FIG. 3d) and places the most recently preferred title at the top. Further, the user's interest is noted in user preferences region 36 as relating to music subjects, particularly directed to children's interests therein.

As further shown in FIG. 3d, the user now places the cursor over the "Return to Storefront" indication at the bottom the screen and clicks thereon, causing a return to the initial web page shown in FIG. 3e. The user then positions the cursor over the thumbs-up icon next to the "computer's bookshelves" line and clicks thereon, causing page construction procedure 32 to access a page template associated with the computer's bookshelves line.

While not visible to the user, each of the text selection lines in FIG. 3f are configured in the screen template as a variable field, with each including a connection value indicative of computer software. However, in lieu of just inserting therein a default listing of selections from computer software subjects that are stored in knowledge base 22, page construction procedure 32 accesses the indicated user preferences from user preference region 36 (for the user that is presently accessing the web page). Those user preferences indicate the user's prior selections of: children's books; and sports and music subjects related to children. As a result, page construction procedure 32 commences with the initial subject area previously chosen by the user (i.e., children's subjects) and selects from knowledge base 22, software having an assigned attribute indicative of being of interest to children. The resulting selections are shown in FIG. 3*f* and list software subjects that are available which also have an applicability to children's subjects. Further, if there are software subjects which have associated connection values that point to both children's subjects and either sports or music, those software subjects are chosen for listing in the screen shown in FIG. 3*f*. As a result, the variable fields on the template are filled with appropriate software subjects and are returned to the user's display as a reply screen.

It is next assumed that the user places the cursor over the "Return to Storefront" field and clicks thereon to return to the first web page (see FIG. 3*g*). There, in lieu of selecting one of the three subject lines, the user places the cursor over, and clicks on the "Suggested Software" line, to determine which software the application on server 18 proposes for user review. In response, page construction procedure 32 accesses a page template associated with the "Suggested Software" line and displays software products that are available for sale or are being specially promoted by the "owner" of the web site (see FIG. 3*h*). In filling the variable fields of the selected page template, however, the user's prior selection of children's subjects is utilized to cause selection of a series of software titles from the "games and edutainment" subject category.

As can be seen from the above description, the response of server 18 to a user query is to provide a return display screen with answers to the user's query. However, the answers are specifically selected in accordance with prior preferences expressed by the user, which are stored by server 18 for future reference. As each new preference is expressed by the user, that preference is included in the user preference storage region and is utilized to construct response screens which have a better chance of responding to the user's prior expressed interests.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A computer-based method for responding to a user query by providing a displayed response that is influenced by a prior indicated preference of the user, said method comprising the steps of:

a) providing a knowledge base of data pertaining to one or more subjects;

b) recording priority information regarding data preferences of said user as a result of analysis of previous entries by said user during prior queries to said knowledge base, said prior queries not necessarily related to a current user query;

c) responding to a current user query regarding a selected subject in said knowledge base, by selecting a template for responding to said current user query, said template containing variable fields;

d) inserting replacement data in said variable fields, said replacement data selected in accord with said priority information for said user which relates to said selected subject; and e) displaying to said user, a screen comprising said template and said replacement data.

2. The method as recited in claim 1, wherein each subject in said knowledge base is associated with a connection value and each variable field in the template selected in step c) also includes a connection value, and wherein step d) bases the replacement data selection, in part, upon subjects which are associated with matching connection values.

3. The method as recited in claim 2, wherein step d) further bases the replacement data selection upon said priority information, said priority information comprising utility values assigned in accord with prior user actions.

4. A computer system for responding to a user query by providing a screen which displays a response that is influenced by a prior expressed preference of the user, said computer system comprising:

means for storing a knowledge base of data pertaining to one or more subjects;

means for monitoring a user's entries and recording priority information regarding data preferences of said user expressed during prior user entries to said knowledge base, said prior entries not necessarily related to a current user query;

means for monitoring a user's current query regarding a selected subject in said knowledge base, and selecting a template for responding to said user's current query, said template containing variable fields;

response means for inserting replacement data in said variable fields, said response means selecting said replacement data in accord with recorded priority information for said user which relates to said selected subject; and display means for providing a screen comprising said template and replacement data.

5. The computer system as recited in claim 4, wherein each variable field in a template is delimited by symbols which enclose at least one connection value, said connection value matching a connection value associated with a set of data items in said knowledge base, said response means employing said connection value to select said set of data items.

6. The computer system as recited in claim 5, wherein data items in said set are assigned preference values in accord with prior user entries relating to said set of data items.

* * * * *